June 26, 1951 W. D. MACGEORGE 2,558,708
TEMPERATURE CONTROLLED FLUID FLOW REGULATOR
Filed May 14, 1948 2 Sheets-Sheet 1

INVENTOR.
WILLIAM D. MACGEORGE
BY
Barr, Borden & Fox
ATTORNEY

Patented June 26, 1951

2,558,708

UNITED STATES PATENT OFFICE 2,558,708

TEMPERATURE CONTROLLED FLUID FLOW REGULATOR

William D. Macgeorge, Havertown, Pa., assignor to Automatic Temperature Control Co., Inc., Philadelphia, Pa., a corporation of Pennsylvania Application May 14, 1948, Serial No. 26,947

9 Claims. (Cl. 236—68)

This invention relates to temperature controlled fluid flow regulators, and particularly to temperature regulators for domestic heating systems.

As such controls have been provided hitherto, they have been expensive, only reasonably accurate, and involved relays and other make and break devices which were subject to erosion and effected radio interference and the like.

It is among the objects of this invention to simplify and cheapen the cost of heating system regulators; to improve the art of thermal regulation; to provide a system utilizing a heat motor with a single vacuum tube and a pair of differential transformers for controlling the thermal flow of hot fluid in a domestic heating system.

Figure 1:
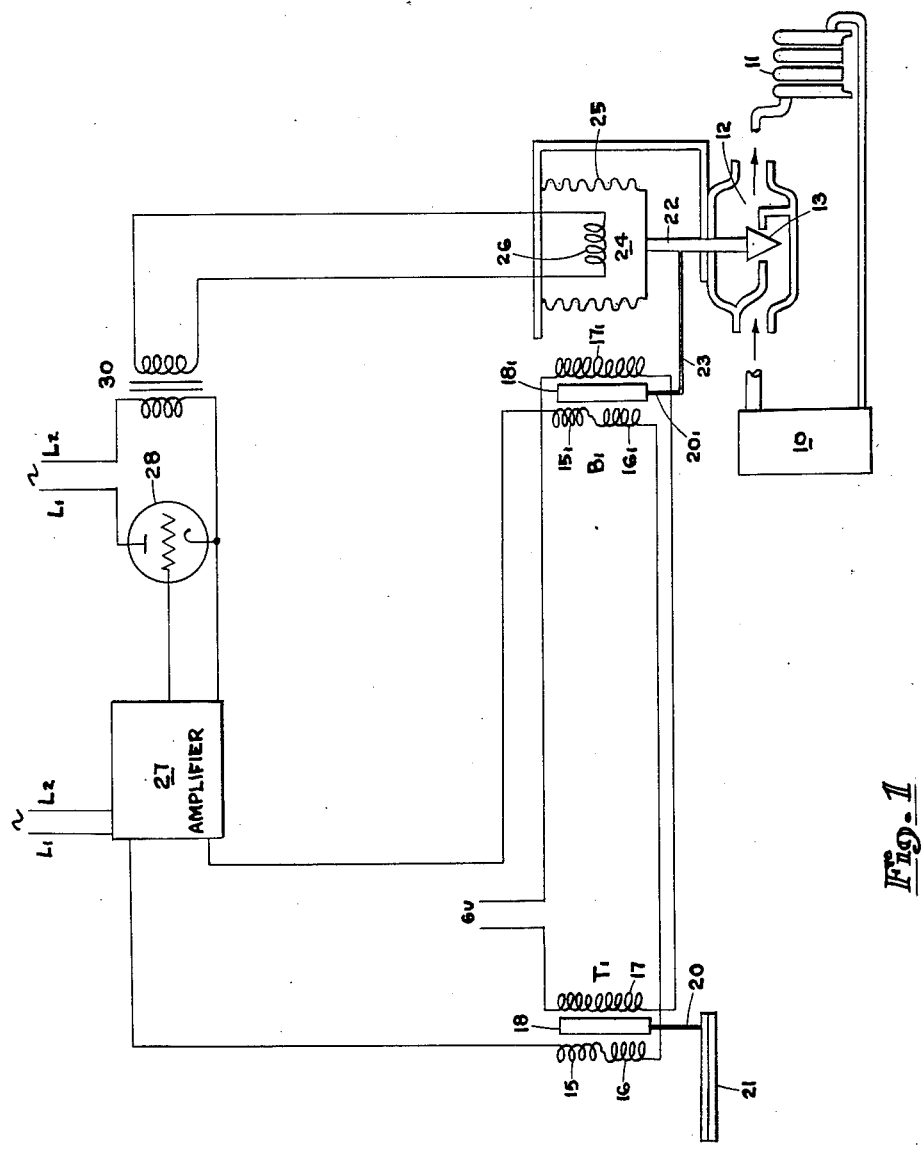

In the accompanying drawings forming part of this description:

Fig. 1 represents diagrammatically the application of the invention to a valve in the line between a source of hot fluid and a radiator from which the heat of the fluid radiates, in conjunction with a circuit device for regulating the fluid flow to the radiator as controlled by a thermostat in position to be affected by the radiation of heat from such radiator.

Figure 2:
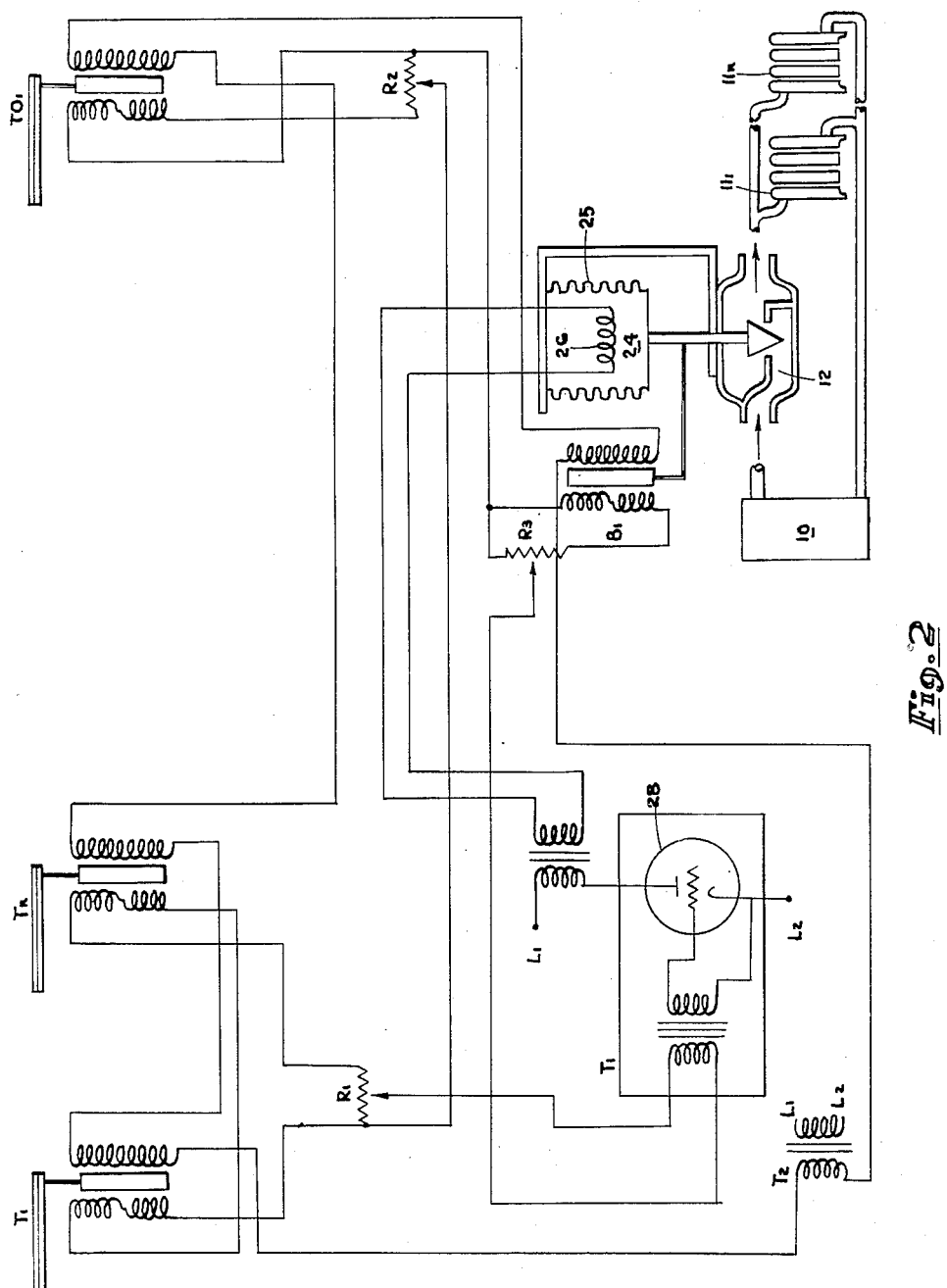

Fig. 2 represents a similar diagrammatic illustration of a plurality of control thermostats functioning the valve controlling the flow from a heating boiler to a plurality of radiators in a domestic heating system, each of which respective radiators is more or less directly effective on a selected single thermostat, and one of which control thermostats is illustratively affected by the external temperatures on the house containing the system, showing the proportioning control effective on the valve.

In Fig. 1 of the drawings, a diagrammatic illustration is given of a single valve in a line between a boiler and a radiator or between radiators with a thermostatic element responsive to house or room temperature coupled operatively to one of two differential transformers, and with a heat motor-controlled valve operatively coupled to the other transformer to furnish a heat motor-actuating output with one sense of output from the coupled differential transformers to close the valve and with the heat motor responding to another sense of output by merely cooling to open the valve.

In carrying out the invention in the illustrative form for a single control, a boiler 10 of a domestic hot water heating system, for instance, is coupled to a radiator or radiator system 11, through a valve 12, of any desired sort. The valve illustratively may comprise a plug or gate valve having a plug or gate element 13, the position of which regulates the opening through the valve and therefore controls the flow of heated fluid between the boiler 10 and the radiator 11. The wider the valve opening the greater the flow and the greater the heat supplied to and radiated from the radiator 11. The room or home temperatures to be controlled are varied in accordance with the flow of heated fluid, whether hot water or steam, through the radiator system 11.

A first differential transformer $T_1$ is provided, comprising secondary coils 15 and 16, preferably axially aligned in spaced relation and coupled in series bucking relation. A primary or exciting coil 17 is provided in the space between the secondaries, in coaxial relation, and a floating or movable armature comprising a mass of magnetic material 18 is disposed concentrically of and movable axially relative to all three coils. The transformers herein and part of the circuit are generally of the nature and functioning of those shown, for instance, in the patent to Hornfeck, No. 2,420,539. The armature 18 is mounted on a link 20 mounted on the operating end of a bimetallic thermostat 21 so that the position of the armature relative to the coils varies with thermostat movement. The setting of the differential transformer for a preferred temperature and setting is accomplished either by varying the length of the link 20 between the thermostat and armature 18, or by axially adjusting the stator, comprised of the three coils 15, 16, and 17, relative to the armature. This complete unit is a signal transmitting unit.

A second differential transformer identified as a balancing or receiving unit $B_1$ is provided, having similar secondaries in series bucking relation, as 15' and 16', on opposite sides of a median exciting primary 17', and having a floating armature 18' on a link 20', with the link 20' thereof rigidly or otherwise operatively connected to the valve stem or shank 22 of the gate or plug 13 of valve 12, as by a rigid arm 23. The upper end of the valve stem 22 is rigidly coupled to the lower end of a heat motor 24 comprising the sealed bellows 25, containing fluid, in which a heating element 26 in the form of a resistor is disposed, and with the fluid filling and sealed in the bellows. A circuit is formed from an A. C. line to a voltage amplifier unit indicated by the block 27, and from which a 6 v. output leads to the respective primaries 17 and 17' in series. Tube 28 is provided with the plate output thereof leading through the primary of a transformer 30, the secondary of which is in a closed circuit through the heating element 26 in the bellows of the heat motor. The respective pairs of secondaries are coupled in bucking series, and the joint output leads into the amplifier from which, after passing through any necessary phase shifting devices and the like, it is incident upon the grid of the tube. The plate circuit is at the line voltage of A. C. The second differential-balancing transformer $B_1$ is initially adjusted to accord properly with valve position by adjusting the stator thereof relative to the armature, or the armature relative to the valve stem, as will be clear.

The respective transformers individually have respective outputs from the secondaries, varying with the relative instantaneous positions of the armature and the stator, between an output of A phase voltage, when the output of one secondary dominates the output of the other secondary, a null output when the voltage of the respective secondaries of the transformer are equal and cancelling, and a voltage of B phase when the output of the other secondary dominates the output of the coupled secondaries. These outputs are respectively either in phase or 180° out of phase, with the line voltage.

Let it be assumed that the temperature in the ambient air incident on $T_1$ increases so that the transformer 14 is sufficiently unbalanced as to secure a selected preponderating voltage output of given phase. The amplifier then impresses on the grid of the tube positive pulses or half cycles in phase with the positive half cycles of the plate, so that the tube will conduct, and through the transformer 30 will energize and heat the resistance 26, which in due course will expand the fluid in the bellows and elongate same, which will move the valve further closed. As the valve moves closed, however, it moves the armature 18' in the second transformer $B_1$ until the output of the latter transformer equals and cancels and then preponderates over the output of the first transformer, and the conductivity of the tube stops and the heat input into the heat motor stops. If, meanwhile, the temperature effective on the thermostat has further increased, again an output of the coupled transformers is provided to make the tube conductive, and the valve is still further closed. Eventually, the reduction of the flow of heat to the radiator is effective by reducing the radiation from the radiator to cause cooling of the ambient air, which reversely affects the thermostat unit $T_1$ which moves the armature 18 in the other direction and secures unbalance of the output in the other direction to furnish a voltage of the opposite phase from the first mentioned output. As the half cycles incident on the grid of the tube are then negative when the half cycles on the plate are positive, the tube continues to fail to conduct, and the heat motor has no additional heat input and with a predetermined slow rate the fluid in the bellows cools and the bellows gradually axially contracts, with a resultant opening of the valve to increase the flow to the radiator. This opening of the valve moves the armature of the second transformer in such a way as to rebalance by its output the thermostatic-motion-created output of transformer 14.

The system is continually hunting as, with lethargy and deliberation, depending upon the radiating rate of the heat motor, as well as upon its expansion rate, the valve 12 is continually being shifted in small increments between opening and closing, while the temperature in the ambient air remains close to the holding point.

It will be evident that the same principle and the same effective control can be secured for either single rooms or for a plurality or, in fact, for an entire house, and can be expanded to include selective controls of a single valve from a plurality of relatively separate and independent controls. To this end a system such as is shown in Fig. 2 may be used. Illustratively, the boiler 10 has its output controlled by the valve 12 with the latter controlled in its position by the same heat motor 24, and the boiler is coupled to a plurality of radiators represented by 11' and 11n. Radiator 11' is in a room or area containing $T_1$ and radiator 11n is in a room or area containing a separate thermostatic unit $Tn$. An outdoor thermostatic unit $TO_1$ is also provided. The same balancing or receiver transformer $B_1$ is provided, operated as a function of the position of the valve stem, and the primaries of all of the transformers are in series connection with a source of 6 v. A. C., from the amplifier. The same tube 28 is provided, having a plate voltage of suitable A. C., say, of 110 v.

With all of the primaries of the three illustrative transformer units in series, preferably, in order that any incidental fluctuations in voltage will be equal on all transformers, and with the secondaries of all transformers in series in a loop circuit, it will be evident that transmitters $T_1$, $Tn$ and $TO_1$, will have additive outputs for balance with the receiving transformer $B_1$. With the transformers having similar coils it will be evident that it would be necessary for the armature of transformer unit $B_1$ to have an exaggerated travel before the output of its coupled secondaries could balance the joint outputs of the plurality of transmitting transformers. In order to reduce the potential of the additive signals of the transmitter to enable balance by the receiver $B_1$ with the same range of armature movements, it is preferred to have the combined outputs pass through a variable resistor $R3$. In order to proportion the effectiveness of the output of any given transmitter or group of transmitters, it is preferred to utilize variable resistor $R1$ in the secondaries circuit, in the event it is found that one room or area is more resistant to heat dissipation than another. Finally, in order to restrict the effectiveness of the outdoor thermostat $TO_1$ in its additive effect on the additive whole of the other transmitters, it is preferred to incorporate the variable resistor $R2$ in its output. This thus enables careful proportioning of the effect of the outdoor temperature on the functioning of the heat motor to the end that when the differential between indoor and outdoor temperatures is low, the output of the transmitter $TO_1$ has but little effect on the total signal. On the other hand, when the differential is high and because of low external temperatures, the signal is strong and effects an enhanced proportion of the total transmitter signal to effect more pronounced opening of the valve than would otherwise be necessary with milder external temperatures. In other words, when the dissipation of the internal heat in the house is at a higher rate because of low exterior temperatures, more heat is supplied in the house than would be required by signal from the transmitters $T_1$ and $Tn$ alone, as determined by the instantaneous interior temperatures.

In the above reference to the fluid that fills the bellows of the heat motor, it will be clear that the fluid may be gaseous or liquid or mixtures of gaseous and liquid, and may be of any desired nature or chemical composition. It is also to be understood that the fluid may comprise a liquid susceptible to quick vaporization under heat capable of returning to a liquid form when cooled.

The wide range of utility of the system and the simplicity and economy thereof will be appreciated.

Having thus described my invention, I claim:

1. A heat regulating system comprising a valve arranged to control the flow of a heated medium when associated in a line containing same, a heat motor operatively associated with the valve to control the setting thereof and comprising an expansible member and an associated resistance, a plurality of thermostatic elements, a plurality of differential transformers each comprising a stator and a relatively movable armature and respectively operatively associated with the respective thermostatic elements of the plurality, a balancing differential transformer comprising a stator and a relatively movable armature operatively associated with the valve, means establishing a circuit containing the outputs of all of the transformers, and means for converting unbalance of one type into energization of said resistance as a direct function of the amplitude of the net signal, and arranged with another type of unbalance to deenergize said resistance.

2. A heat regulating system for operative association with a movable element for controlling the flow of a heated medium, comprising a heat motor, means for operatively associating the heat motor with the movable element, a plurality of thermostatic elements, means establishing a circuit, a plurality of means in the circuit each respectively controlled by the respective thermostatic elements for developing additive signals, means in said circuit operative as a function of heat motor operation for developing a signal subtractive of the additive signal to furnish a net resultant signal, thermionic means in the circuit for supplying potential for energizing the heat motor with one sense of net resultant signal proportionally to the amplitude of the net signal and for supplying no potential to the heat motor with another sense of net resultant signal.

3. A heat regulating system comprising a valve arranged to control the flow of a heated medium when associated in a line containing same, a heat motor operatively associated with the valve to control the setting thereof and comprising an expansible member and an associated electrical heating means, a plurality of thermostatic elements, a plurality of differential transformers each comprising a stator and a relatively movable armature and respectively operatively associated with the respective thermostatic elements of the plurality, a balancing differential transformer comprising a stator and a relatively movable armature operatively associated with the valve, means establishing a circuit containing the outputs of all of the transformers, means for converting unbalance of said circuit of one type into energization of said electrical heating means proportionally to the amplitude of said unbalance, and arranged with another type of unbalance to deenergize said electrical heating means, and means in the circuit for proportioning the effectiveness of the signal contributed by one of the differential transformers.

4. A heat regulating system comprising a valve arranged to control the flow of a heated medium for controlling a given atmospheric temperature condition, a heat motor comprising a sealed chamber containing fluid expansible when heated and contractible when cooled and electrical heating means operative on the fluid, means connecting the heat motor to the valve, a thermostat disposed to be affected by the said given atmospheric temperature condition, means establishing a circuit, a first differential transformer operatively coupled with the thermostatic element and arranged to furnish signals to the circuit, a second differential transformer operatively coupled with the means connecting the heat motor and valve and arranged to furnish signals to the circuit subtractive of those from the first transformer, a thermionic device the grid of which is in said circuit to discharge said tube in response to one sense of net resultant signal in the circuit proportionally to the amplitude of said one sense of signal, the output of said device coupled with the heating means in the heat motor to deliver a potential to the said heating means with said one sense of net resultant signal in the circuit proportionally to the amplitude thereof, said tube being substantially inert and delivering no potential to the electrical heating means element with the opposite sense of net resultant signals.

5. A heat regulating system comprising a valve arranged to control the flow of a heated medium for controlling a given atmospheric temperature condition, a heat motor comprising a sealed chamber containing fluid expansible when heated and contractible when cooled and electrical heating means operative on the fluid, means connecting the heat motor to the valve, a thermostat disposed to be affected by the said given atmospheric temperature condition, means establishing a circuit, a first differential transformer operatively coupled with the thermostatic element and arranged to furnish signals to the circuit, a second differential transformer operatively coupled with the means connecting the heat motor and valve and arranged to furnish signals to the circuit subtractive of those from the first transformer, a thermionic device in the circuit in operative association with the heating means in the heat motor to deliver a potential to the said heating means with one sense of net resultant signal in the circuit proportionally to the amplitude of said net resultant signals and to deliver no potential to the heating means element with the opposite sense of net resultant signals, and a third differential transformer in said circuit arranged to furnish signals additive to those of the first transformer, a thermostatic element operatively coupled to said third transformer and arranged for exposure to ambient temperatures extraneous of the given atmospheric temperature condition, which ambient temperatures have a modifying effect on the said given temperature condition.

6. A heat regulating system comprising a valve arranged to control the flow of a heated medium for controlling a given atmospheric temperature condition, a heat motor comprising a sealed chamber containing fluid expansible when heated and contractible when cooled and electrical heating means operative on the fluid, means connecting the heat motor to the valve, a thermostat disposed to be affected by the said given atmospheric temperature condition, means establishing a circuit, a first differential transformer operatively coupled with the thermostatic element and arranged to furnish signals to the circuit, a second differential transformer operatively coupled with the means connecting the heat motor and valve and arranged to furnish signals to the circuit subtractive of those from the first transformer, a thermionic device in the circuit in operative association with the heating means in the heat motor to deliver a potential to the said heating means with one sense of net resultant signals in the circuit proportionally to the amplitude of said net resultant signals and to deliver no potential to the heating means element with the opposite sense of net resultant signals, and a third differential transformer in said circuit arranged to furnish signals additive to those of the first transformer, a thermostatic element operatively coupled to said third transformer and arranged for exposure to ambient temperatures extraneous of the given atmospheric temperature condition, which ambient temperatures have a modifying effect on the said given temperature condition, and means in the circuit for proportioning the relative effects of the first and third transformers in the net resultant signals.

7. A regulating system comprising a first and a second movable element differential transformer, means for energizing the transformers with A. C., each transformer having one relative position of the movable element at which the output of the transformer is substantially null and having an output of one phase or an opposite phase according to the sense of departure of the relatively movable element from the substantially null output relative position varying in amplitude according to the degree of such departure, a valve, a fluid-filled sealed expansible bellows coupled to said valve to position same variably in response to variations in pressure in said bellows, electrical heating means operative on the fluid in the bellows to control the pressure therein, condition-responsive means coupled to the movable element of the first transformer, means coupling said valve to the movable element of the second transformer to position same, a vacuum tube, circuit means coupling the output of the first and second transformers to the grid of said tube to energize same with the phase and amplitude of the net resultant of the outputs of the first and second transformers, means establishing the power anode-cathode circuit of said tube with A. C. having substantially the same phase or the opposite phase as the net resultant of said transformers and means for impressing the power output of said tube upon said heating means only when the grid and anode of the tube are simultaneously positive with an amplitude proportional to the amplitude of the net resultant on said grid, whereby heating of the heating means and the expansion of the bellows is a function of the discharge of said tube and cooling of the resistance and contraction of the bellows follows termination of the discharge of said tube.

8. A regulating system comprising a first and second movable element differential transformer, condition-responsive means coupled to the movable element to position same as a function of variations in condition, a valve, a second movable element differential transformer, means coupling the valve and the movable element of the second transformer to position same as a function of valve positioning, a fluid-filled sealed bellows coupled to said valve to position the same, electrical heating means operative on the fluid in the bellows, a vacuum tube, a network for coupling to a source of A. C., means in the network for energizing both transformers to produce outputs therefrom varying between null and an output of one phase or the opposite phase according to the positioning of the respective relatively movable elements thereof, means in the network for applying the net resultant outputs of the two transformers on the grid of said tube as a signal, means in the network establishing the cathode anode circuit of the tube with A. C. substantially identical in phase with one sense of signal on said grid and opposite in phase with the opposite sense of signal on said grid, and means in the network coupling the anode cathode circuit and said heating means whereby the latter is energized and heated in said bellows only when the phase of the cathode anode circuit is substantially identical with that of the signal on the grid, and whereby the heating of said heating means is proportional to the amplitude of signal on said grid.

9. A regulating system for operative association with a valve for controlling the flow of a medium affecting a condition, comprising a heat motor, means for operatively associating said heat motor with such valve, said heat motor comprising a closed expansible element containing fluid expansible when heated and contractible when cooled, and electrical heating means operative on the fluid, a movable element differential transformer responsive to said condition for producing a substantially null output in one relative setting of the transformer, and producing A. C. signals of respectively substantially opposite phases as the movable element moves from its substantially null output setting in one sense or the other, a multi-element tube, means providing an A. C. cathode-anode circuit of phase substantially the same as or substantially opposite to the phase of the output of said differential transformer, said circuit coupled to said electrical heating means to energize same when the tube conducts, and means for impressing said A. C. signals effectively on the grid of said tube whereby only when said signals are of such phase that the plate and grid are simultaneously positive is said tube discharged and said heating means energized.

WILLIAM D. MACGEORGE.

REFERENCES CITED

The following references are of record in the file of this patent:

UNITED STATES PATENTS

| Number | Name | Date |
|---|---|---|
| 1,819,588 | Bennett | Aug. 18, 1931 |
| 2,286,376 | Ray | June 16, 1942 |
| 2,339,289 | Olken | Jan. 18, 1944 |
| 2,349,963 | Harrison | May 30, 1944 |
| 2,434,941 | Machlet | Jan. 27, 1948 |
| 2,498,864 | Root | Feb. 28, 1950 |